April 15, 1941.  H. WEHRLIN  2,238,298

HIGH FREQUENCY CURRENT MEASURING DEVICE

Original Filed Feb. 18, 1937

Inventor:
Hans Wehrlin
by E. D. Phinney
Att'y

Patented Apr. 15, 1941

2,238,298

UNITED STATES PATENT OFFICE 2,238,298

HIGH FREQUENCY CURRENT MEASURING DEVICE

Hans Wehrlin, Gumligen, near Berne, Switzerland, assignor to C. Lorenz Aktiengesellschaft, Berlin-Tempelhof, Germany, a company Original application February 18, 1937, Serial No. 126,531. Divided and this application September 22, 1938, Serial No. 231,181. In Germany February 18, 1936

8 Claims. (Cl. 171—95)

My invention relates to high frequency current measuring devices employed in combination with current transformers for indicating at a remote point the value of a high frequency current flowing in a conductor line. Suitable current transformers for cooperating with the device hereinafter described are set forth in my copending United States patent application Serial No. 126,531, now Patent No. 2,214,915, entitled "High frequency current transformers," filed on February 18, 1937, of which application this is a division.

It is a well known expedient to employ current transformers when high frequency currents are to be measured at a remote point by means of high frequency current metering devices. If such devices would be interposed in the high frequency conducting line, the space capacity of the metering device would amount to an unpermissible value, while the space capacities may be considerably reduced in connection with current transformers.

Figure 1:
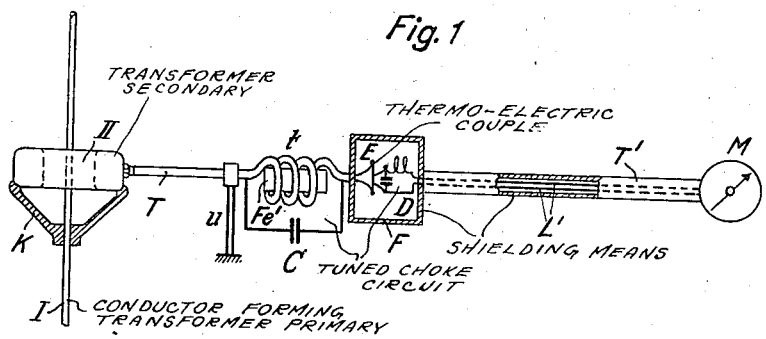
Figure 2:
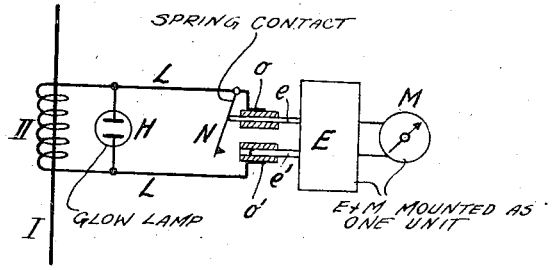

My invention consists in certain features of novelty which will be fully understood from the following description and be pointed out in the appended claims, reference being had to the accompanying drawing, in which Fig. 1 shows one embodiment according to the invention, while Fig. 2 illustrates a modification of the arrangement shown in Fig. 1.

In Fig. 1 the left portion shows a current transformer, while the right portion thereof represents the current metering device. The current transformer consists of a conductor I which constitutes the primary winding of the transformer. The secondary winding thereof is denoted II. This secondary coil is mounted relative to the conductor I by means of a supporting member K of insulation. The line T interconnecting the current transformer and the measuring device is electrically associated with the secondary coil II of the current transformer.

The measuring device comprises a direct current indicator M and a thermo-electric-couple E interconnected with one another. If the thermo-couple E and the indicator M are not combined in one unit, the line L' interconnecting these two devices should be carefully screened by a tube T', since this line would otherwise pick up disturbing high frequency current from conductor I. Since the thermo-electric-couple E becomes heated by a high frequency current picked up by the line L', the indicator M would deflect its pointer and thus give a wrong indication. If the most careful shielding is not sufficient to obviate this drawback, a choke or a filter chain D may suitably be interposed between the thermo-couple E and the indicator M in order to prevent high frequency energy picked up by the line L' from affecting the thermo-couple. An arrangement of the last mentioned type might be positioned between the current transformer and the thermo-couple E in cases where the measuring device is protected against currents which are picked up by the line L'. The thermo-couple and choking device assembly may be arranged in a shield F common thereto.

If the line interconnecting the current transformer and the thermo-electric-couple E or indicator M is longer than one-quarter of the operating wavelength, the screening tube T is preferably partially given a helical shape as shown at $t$ so that the conductor in the interior of the shielding T presents the shape of a choke coil, which may be provided with a core $Fe'$ of high frequency iron. The shielding T is grounded by means of conductor $u$ between the secondary coil II of the current transformer and the helical portion $t$ of the line, preferably at a current anti-node or a potential node. If a definite operating frequency is employed, a condenser C may be connected across the helical portion $t$ in order to provide an arrester or rejector circuit which is tuned to the operating frequency.

The modification shown in Fig. 2 involves the feature that the measuring device assembly EM is detachably and exchangeably associated with the line. This is accomplished by the agency of plug contacts $e$, $e'$ adapted to be inserted in sleeves $o$, $o'$ to which the secondary coil of the current transformer is connected over the line L. Care should be taken that the transformer is automatically short-circuited when removing the device E, M from the plug sleeves $o$, $o'$, since otherwise very considerably high frequency voltages may persist at these sleeves. One example of an arrangement provided for this purpose is shown in the shape of a contact spring N which tends to make contact with the sleeve $o'$ when the plug $e$ is withdrawn from its corresponding sleeve $o$. Moreover, the occurrence of high voltages in the case of wire breakage on the secondary side can be obviated by a glow discharge tube H shunted across the two lines L.

What is claimed is:

1. A high frequency meter assembly comprising a high frequency current transformer, a high frequency current measuring device comprising a thermo-electric-couple, a shielded conductor line interconnecting said transformer and said thermo-electric-couple, a direct current indicator, shielded means interconnecting said thermo-electric-couple and said direct current indicator, and a choke means formed from said shielded conductor line interposed between said transformer and said high frequency measuring device at a point near said measuring device.

2. A high frequency meter assembly comprising a high frequency current transformer, a high frequency current measuring device comprising a thermo-electric-couple, a shielded conductor line interconnecting said transformer and said thermo-electric-couple, a direct current indicator, shielded means interconnecting said thermo-electric-couple and said direct current indicator, a choke means formed from said shielded conductor line interposed between said transformer and said high frequency measuring device at a point near said measuring device, and means for tuning said choke means to the operating frequency of said assembly.

3. A high frequency meter assembly comprising a high frequency current transformer, a high frequency current measuring device comprising a thermo-electric-couple, a shielded conductor line interconnecting said transformer and said thermo-electric-couple, a direct current indicator, a second shielded conductor line interconnecting said thermo-electric-couple and said direct current indicator, and high frequency choke means interposed in each of said conductor lines to isolate said high frequency current measuring device from high frequency interference.

4. A high frequency meter assembly comprising a high frequency current transformer, a high frequency current measuring device comprising a thermo-electric-couple, a shielded conductor line longer than a quarter wavelength at the operating frequency interconnecting said transformer and said thermo-electric-couple, a direct current indicator, shielded means interconnecting said thermo-electric-couple and said direct current indicator, and a helical coil formed in said conductor from the part spaced more than a quarter wavelength from said transformer, and a tuning condenser connected across the helical turns of said coil.

5. A high frequency meter assembly comprising a high frequency current transformer, a high frequency current measuring device comprising a thermo-electric-couple, a shielded conductor line longer than a quarter wavelength at the operating frequency interconnecting said transformer and said thermo-electric-couple, a direct current indicator, shielded means interconnecting said thermo-electric-couple and said direct current indicator, a helical coil formed in said conductor from the part spaced more than a quarter wavelength from said transformer, a tuning condenser connected across the helical turns of said coil, and means grounding said conductor shield at a point spaced substantially a quarter wavelength from said transformer.

6. A high frequency meter assembly comprising a high frequency current transformer, a high frequency current measuring device comprising a thermo-electric-couple, a shielded conductor line longer than a quarter wavelength at the operating frequency interconnecting said transformer and said thermo-electric-couple, a direct current indicator, shielded means interconnecting said thermo-electric-couple and said direct current indicator, a helical coil formed in said conductor from the part spaced more than a quarter wavelength from said transformer, a high frequency iron core in said helical coil, and a tuning condenser connected across the helical turns of said coil.

7. A high frequency assembly according to claim 1, wherein the thermo-electric-couple and direct current indicator are comprised in one device, further comprising plug contacts fitted to said high frequency measuring device, and plug sleeves connected to the secondary coil of said transformer to receive said plug contacts.

8. A high frequency assembly according to claim 1, wherein the thermo-electric-couple and direct current indicator are comprised in one device, further comprising plug contacts fitted to said high frequency measuring device, plug sleeves connected to the secondary coil of said transformer to receive said plug contacts, and means to short circuit said secondary coil upon removal of said instrument.

HANS WEHRLIN.